United States Patent

Chen et al.

[11] Patent Number: 5,969,864
[45] Date of Patent: Oct. 19, 1999

[54] VARIABLE SURFACE RELIEF KINOFORM OPTICAL ELEMENT

[75] Inventors: Chungte W. Chen, Irvine; David M. Capps, Hermosa Beach, both of Calif.

[73] Assignee: Raytheon Company, Lexington, Mass.

[21] Appl. No.: 08/937,640

[22] Filed: Sep. 25, 1997

[51] Int. Cl.[6] .................................................. G02B 5/18
[52] U.S. Cl. ..................... 359/569; 359/573; 359/574; 359/575; 359/565
[58] Field of Search ...................................... 359/565, 566, 359/569, 573, 574, 575

[56] References Cited

U.S. PATENT DOCUMENTS

| | | | |
|---|---|---|---|
| 5,227,915 | 7/1993 | Grossinger et al. | 359/565 |
| 5,446,565 | 8/1995 | Komma et al. | 359/19 |

OTHER PUBLICATIONS

Applied Optics, Aug., 1970, vol. 9, No. 8, "Kinoform Lenses" By J.A. Jordan, Jr., et al.
Infrared Application of Diffractive Optical Elements, pp. 7–14, by Gary J. Swanson, et al.
Critical Reviews vol. CR49, Diffractive and Miniaturized Optics, Imagining by diffraction: grating design and hardware results pp. 77–97, By C.W. Chen, et al.
Binary Optics Technology: Theoretical Limits on the Diffraction Efficiency of Multilevel Diffractive Optical Elements, By G. J. Swanson, Mar. 1991, 10 pages.

*Primary Examiner*—Thong Nguyen
*Assistant Examiner*—Craig Curtis
*Attorney, Agent, or Firm*—Colin M. Raufer; Leonard A. Alkov; Glenn H. Lenzen, Jr.

[57] ABSTRACT

A kinoform optical element (KOE) has different surface relief heights in different zones of the kinoform surface, in order to optimize the first order diffraction efficiency in each zone. By increasing the first order diffraction efficiency, noise as well as ghost image problems may be reduced and contrast and resolution may be enhanced. In an exemplary embodiment, each zone, or even different areas of the same zone, has a non-constant step height that is preferably defined by a predetermined relationship between an optimal step height and an associated predominant angle of incidence associated with that particular zone or area. In the case of an optical system having a relatively large aperture and a relatively narrow field of view, each point of the KOE sees the entire image; the associated predominant angle of incidence at that point may be defined by a so-called "marginal" ray from the center of the entire image space (i.e., on the optical axis and at the effective "middle" of the usable depth of field). In the case of an optical system having a relatively small aperture and a relatively wide field of view, each point of the KOE sees only a portion of the image; the associated predominant angle of incidence at that point may be defined by an exemplary ray from the portion of the image space that is visible from that point. Since the optimum surface relief is dependent on the angle of incidence of the radiation relative to the orientation of the surface, diffraction efficiency can also be optimized by providing the kinoform with a non-planar surface contour such that all the predominant rays are normal to the active surface, in which case all the steps may have the same height.

6 Claims, 3 Drawing Sheets

VARIABLE SURFACE RELIEF KINOFORM OPTICAL ELEMENT

This invention was made with Government support under Contract No. DAAB07-96-3-J016 awarded by the Department of the Army. The Government has certain rights in this invention.

TECHNICAL FIELD

The present invention relates generally to kinoform optical elements such as diffraction gratings and Fresnel phase zone plates, and more particularly to a high diffraction efficiency kinoform optical element whose design has been optimized for rays intersecting the active surface of the kinoform element in directions that are not necessarily parallel to its optical axis.

BACKGROUND

A "Fresnel phase zone plate" is similar in appearance to a conventional Fresnel lens, in that it comprises several concentric rings, which from the side look like a series of sawtooth-shaped ridges. However, the phase element is based on diffraction rather than refraction and has many more zones and a much smaller difference in height between adjacent zones compared to a conventional Fresnel lens, with a typical height difference of a phase zone lens element corresponding to a phase change of only $2\pi$ (one wavelength). It is typically produced by etching or machining the ridges into a surface, which may be a thin sheet of transparent material, or the spherical surface of a conventional refractive lens. A kinoform is a generalized form of Fresnel phase zone plate having an arbitrary phase profile, for example the interference pattern defined by two arbitrary coherent point sources on an arbitrary surface, to which an arbitrary 2-dimensional phase profile defined by an arbitrary polynomial may be added. In particular, a Fresnel phase zone plate may be defined by the interference pattern produced on a flat plane normal to the optical axis defined by the two points, with one point at infinity.

Diffraction efficiency for a given diffraction order is a measure of how much light goes into that order as opposed to all the other diffraction orders. Fresnel phase zone plates can provide a very high diffraction efficiency, at least in the first diffraction order. The spacing between adjacent zones of a conventional kinoform lens is not constant, but grows smaller as the distance from the optical axis increases; however, the grating height of each ridge, called the surface relief height, which is the distance between the highest point and the lowest point of the same zone (or of two adjacent zones) is usually constant. For collimated light at the design wavelength that is incident on the phase zone lens element in a normal direction, essentially all of the light will be diffracted in a direction corresponding to the first diffraction order.

The zones in a kinoform typically take the form of circular annular rings; however the zones may assume other shapes, such as bars (as in a conventional spectrographic grating) and ellipses (to produce different focal lengths at different angular orientations about the optical axis). Moreover, groups of zones may be arranged in a two-dimensional cellular array, with each cell functioning as an individual optical element. Within each zone, the theoretically optimal depth profile is a smooth curve extending continuously from a highest region to a lowest region; however for ease of manufacturablity, the optimal profile may be approximated as a series of steps (phase levels) each of constant depth.

Theoretical constraints limit the diffraction efficiency obtainable from either continuous or multi-level diffractive optical elements. Assuming that the underlying assumptions for the "scalar diffraction theory" (the incident light is bent by a small angle and the diffracted field is observed far from the diffraction structure), the "Fresnel approximation" (a spherical wave can be approximated by a quadratic) and "Fraunhofer diffraction" (the quadratic phase terms can be ignored) are all valid, the diffraction efficiency $\eta_q^n$ of the $q^{th}$ order of an N-level diffraction zone is:

$$\eta_q^N = \left[ \frac{\sin[\pi(q - \varphi_0)] \sin(\pi q / N)}{\pi q \, \sin[\pi(q - \varphi_0)/N]} \right]^2$$

where $\phi$ is the phase depth change (in waves) of each subperiod (phase level) and $\phi_o = \phi \cdot N$ is the total phase depth change (in waves) within each zone.

For an infinite number of phase levels N, this equates to:

$$\eta_q^\infty = \left[ \frac{\sin[\pi(q - \varphi_0)]}{\pi q} \right]^2$$

Thus, at least when the above assumptions are valid, the diffraction efficiency of the $q^{th}$ diffraction order can be approximated as a function which depends only on the number of phase levels N in each zone and the phase shift (in waves) (represented by $\phi_o$); in accordance with the above equations, for first order diffraction (q=1), the theoretical maximum (100%) corresponds to a phase shift of one wave ($\phi_o = 1$).

Applying Snell's law to the case of a stepped diffraction plate formed from an optical material having an index of refraction n surrounded by air and a step height of $\delta d$ (measured in the normal direction), the effective phase height $\phi$ of each step is a function of the angle $\theta$ by which the incident light deviates from the normal of the surface:

$$\varphi = \frac{\delta d \left[ \sqrt{n^2 - \sin^2 \theta} - \cos \theta \right]}{\lambda}$$

Thus, KOE diffraction efficiency for a phase zone plate having a given number of steps each of a predetermined height depends not only on wavelength and refractive index, but also on incident angle.

Although a solitary diffractive lens is generally not suitable for use over a wide range of wavelengths, diffractive lens elements have been used to compensate for aberrations inherent in spherical refractive elements in broadband applications in both the visible and the infrared spectra. Combining kinoform (diffractive) and optical (refractive or reflective) elements generally reduces the number of optical elements by one third and requires no special glass materials for secondary chromatic aberration correction.

SUMMARY

The present invention provides a kinoform optical element (KOE) which has different surface relief heights in different zones of the kinoform surface, in order to optimize the first order diffraction efficiency in each zone. By increasing the first order diffraction efficiency, noise as well as ghost image problems may be reduced and contrast and resolution may be enhanced. Another more specific aspect of the present invention relates to a binary kinoform optical element in which each zone, or even different areas of the same zone, has a non-constant step height that is preferably defined by a predetermined relationship between an optimal step height and an associated predominant angle of incidence associated with that particular zone or area.

The advantages of the invention are particularly apparent in high numerical aperture and wide field of view optical systems in which all rays incident on a given point on the active surface of the kinoform are not aligned uniformly about the associated normal vector. In the case of an optical system having a relatively large aperture and a relatively narrow field of view, each point of the KOE sees the entire image; the associated predominant angle of incidence at that point may be defined by a so-called "marginal" ray from the center of the entire image space (i.e., on the optical axis and at the effective "middle" of the usable depth of field). In the case of an optical system having a relatively small aperture and a relatively wide field of view, each point of the KOE sees only a portion of the image; the associated predominant angle of incidence at that point may be defined by an exemplary ray from the portion of the image space that is visible from that point.

Since the optimum surface relief is dependent on the angle of incidence of the radiation relative to the orientation of the surface, diffraction efficiency can also be optimized by providing the kinoform with a non-planar surface contour such that all the predominant rays are normal to the active surface, in which case all the steps may have the same height.

The foregoing and additional features and advantages of this invention will become further apparent from the detailed description and accompanying drawing figures that follow. In the figures and written description, numerals indicate the various features of the invention, like numerals referring to like features, throughout for the drawing figures and the written description.

DRAWINGS

DETAILED DESCRIPTION

Figure 1:
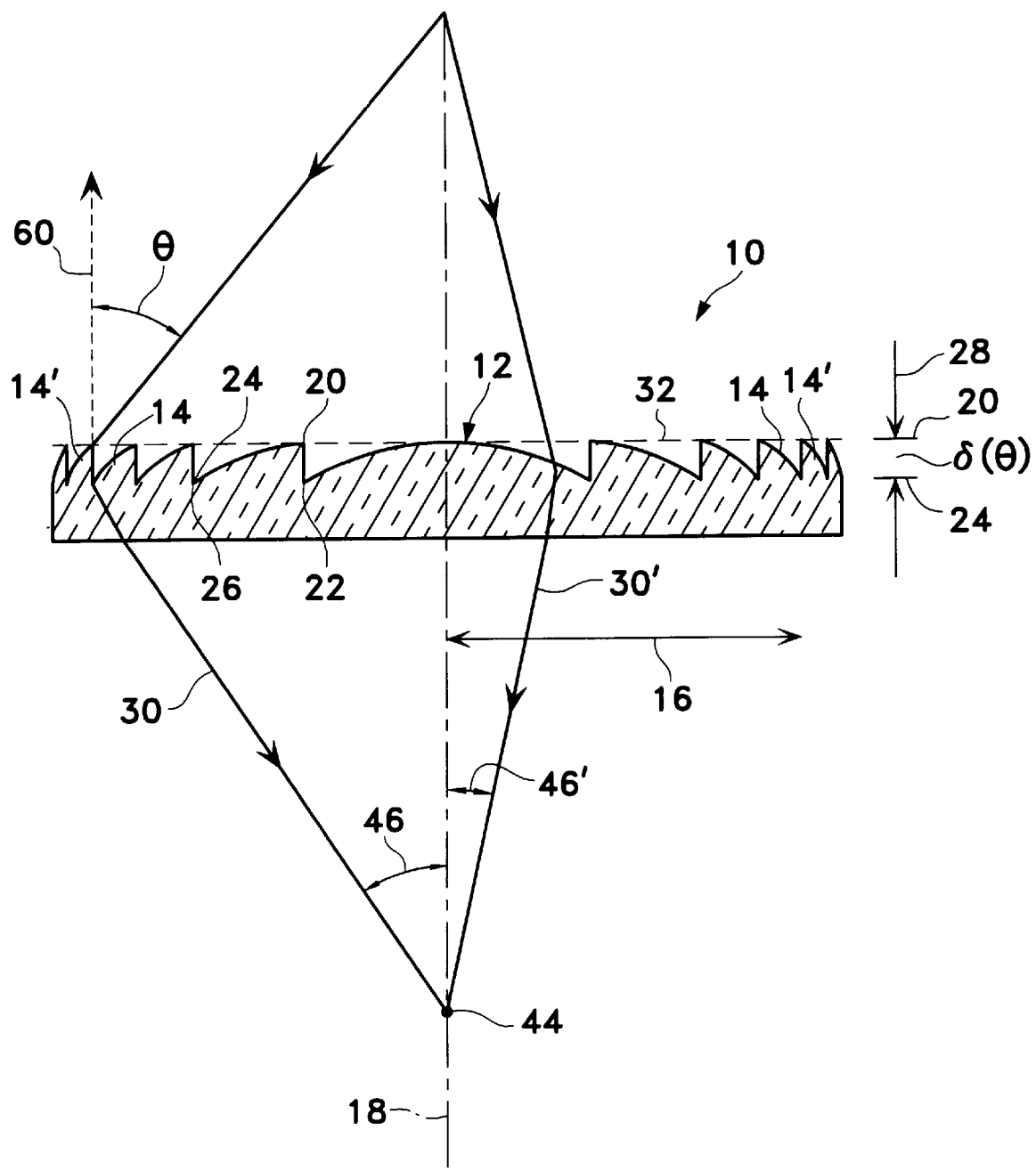
FIG. 1 is a cross sectional view of a kinoform optical element in the form of a phase zone plate.
Figure 2:
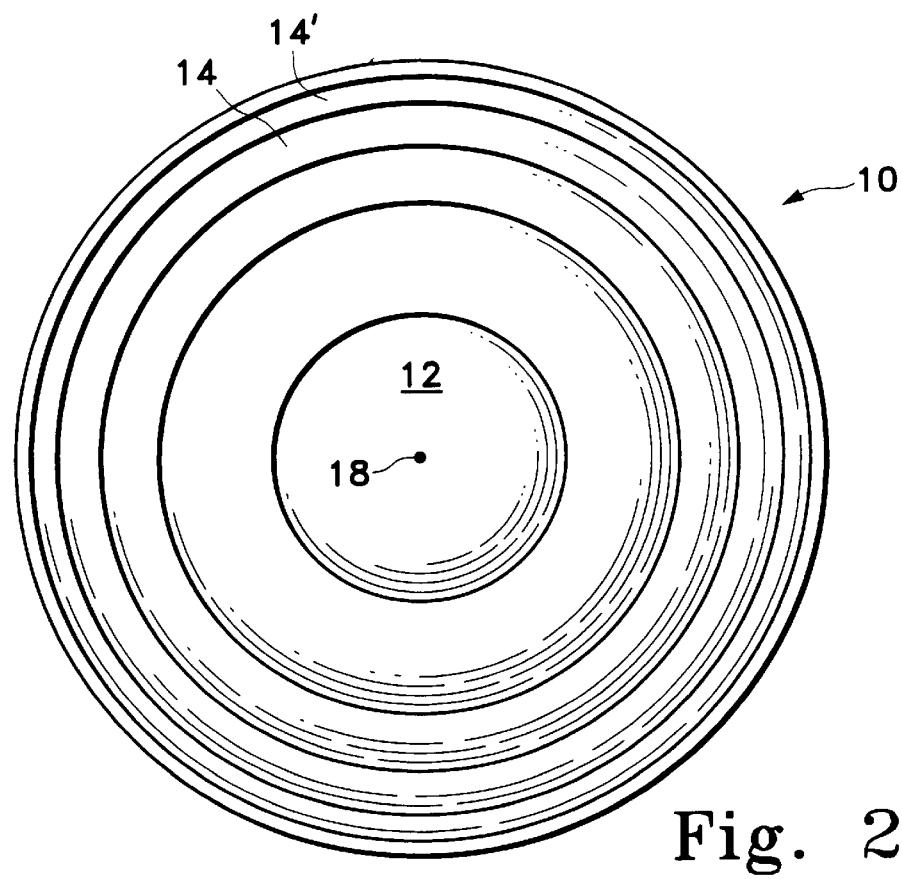
FIG. 2 is a plan view of the KOE of FIG. 1.

Referring to FIGS. 1 and 2, it can be seen that an exemplary Kinoform Optical Element (KOE) may assume the form of a Fresnel phase zone plate 10, comprising a central zone 12 surrounded by a plurality of concentric annular zones 14. Each of the annular zones 14,14' has a depth profile similar to the surface profile of a portion of a corresponding refractive lens at the same distance 16 from the optical axis 18, varying from a minimum depth 20 at the inner circumference 22 to a maximum depth 24 at the outer circumference 26. The difference 28 between the minimum and maximum depths (20,24) is known as the "surface relief height", and is typically on the order of one wavelength (λ) for a phase zone plate, so that light from one zone 14 may be combined with light from an adjacent zone 14' that has been delayed by exactly one wavelength, with the combined light being bent in a direction 30 corresponding to the "first diffraction order".

Although FIGS. 1 and 2 show a KOE having a generally planar external surface 32 on which are defined (as best seen in FIG. 2) annular zones 14,14' that are circular in shape and concentric about a single circular center 12, those skilled in the arc will recognize that the principles of the present invention are equally applicable to other configurations of KOE's, for example, a KOE having an external surface 32 that is convex or concave and/or having zones 14 that are elliptical or rectangular in shape, or a KOE comprising a number of cells, each with its own center 12. Moreover, rather than being an isolated element with air on either side, the KOE 10 can be in direct contact with (or formed on the surface of) another element of an optical system (for example, a spherical refractive lens) which has an index of refraction greater than 1.

Figure 3:
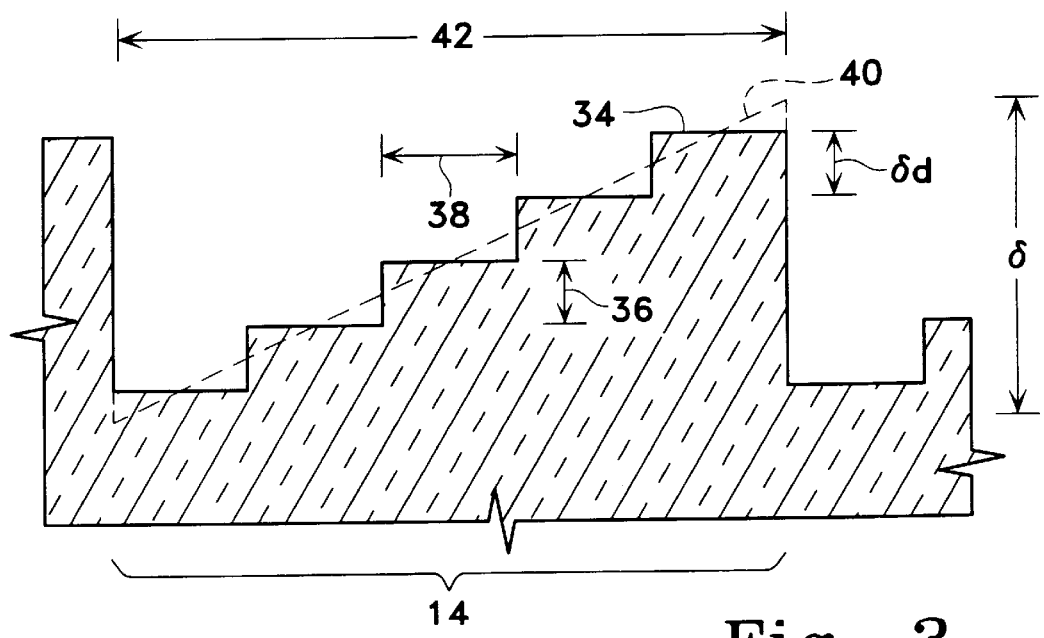
FIG. 3 shows a partial view of the KOE of FIG. 1, with the individual steps in a zone clearly visible.

As shown in FIG. 3, each zone 14 of the KOE 10 may be manufactured in the form of a number (N) of steps 34, each having an associated height 36 and width 38. As illustrated, all the steps 34 in a given zone are the same height, resulting in an effective profile 40 that is a straight line; however, those skilled in the art will realize that in order for the KOE to function as a lens with a finite focal length, the spacing 42 between zones and the surface profile within a zone should be varied in accordance with the desired KOE phase function, so that light parallel to the optical axis 18', may be focused on a common point 44 by bending it at different angles 46,46', depending on the distance 16 from the optical axis 18. Accordingly, not only the spacing 42 between zones and the width 38 of each step within a zone will preferably not be constant but will vary so as to provide a profile 40 that is typically not straight but rather spherical or aspherical, similar to that shown in FIGS. 1 and 2.

Two practical embodiments of the invention will now be discussed.

Figure 4:
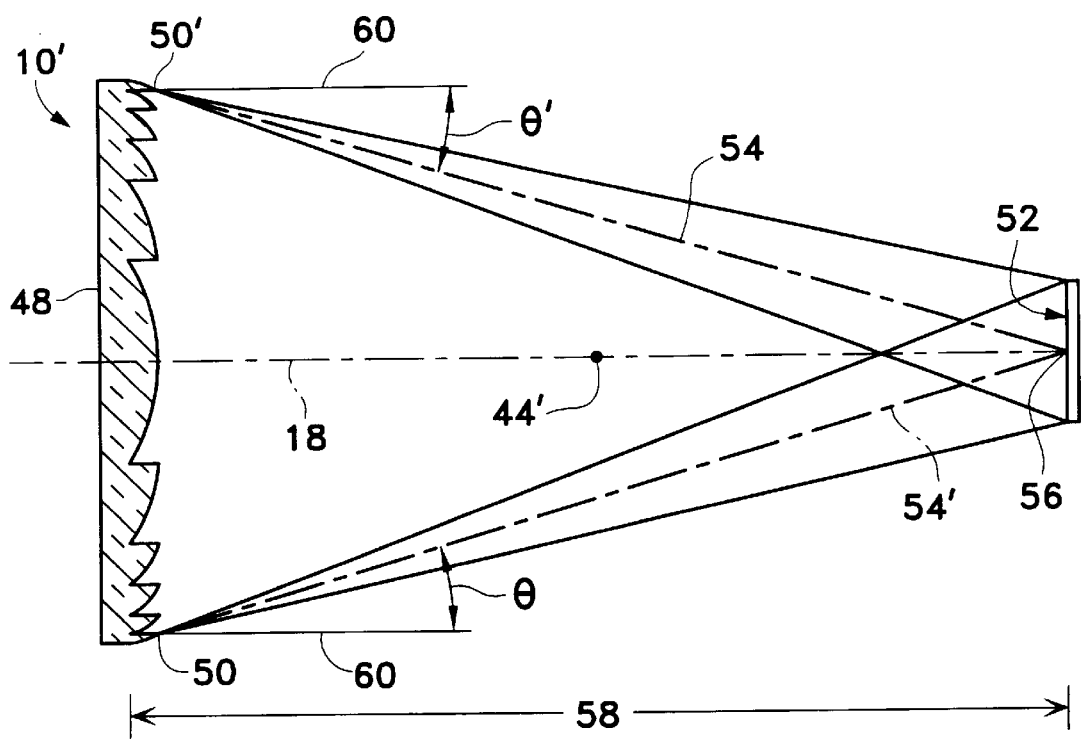
FIG. 4 shows the KOE of FIGS. 1–3 used in an optical system having a wide field of view.

FIG. 4 shows KOE 10 designed for a low light level application and having a relatively large KOE area 48 and an associated relatively large effective aperture, in which each point 50,50' of the KOE sees light from the entire image 52. In that case, the predominant angle of incidence at a given point on the KOE may be defined by a so-called "marginal" ray 54,54' to an exemplary point 56 of an exemplary image 52 on the optical axis 18. Since the predominant angle of incidence θ,θ' (angular deviation from normal) will vary depending on the distance 58 of the image from the KOE, with a closer image resulting in a greater angular deviation, the distance from the KOE to the exemplary image should be selected to be in the vicinity of the "middle" of the usable distance range (depth of field); alternatively, the predominant angle of incidence can be selected to be halfway between the angles of the marginal rays to respective images (not shown) at the minimum and maximum of the usable depth of field. For many applications, it will probably suffice to assume that the image distance 58 is equal to twice the focal length 2F from the KOE 10' to the focal point 44'.

Once the predominant angular deviation (θ) from normal 60 has been determined, and setting φ=1/N (which corresponds to an optimal ($\phi_o$ of unity) in equation (3), the step height δd (measured in the normal direction 60, see also FIG. 1) may b computed from the equation:

$$\delta d(\theta) = \frac{\lambda/N}{\sqrt{n^2 - \sin^2\theta} - \cos\theta}$$

where λ is the wavelength of interest, N is the number of steps, n is the refractive index, and θ is the angular deviation of the predominant ray from the normal to the surface. Note that for the case where $\theta=0$, the predominant ray is normal to the surface and $$\delta d(0) = \frac{\lambda/N}{n-1}. \quad (5)$$

Combining equations (4) and (5), the correction factor $K(\theta)$ to be applied to the optimal step height $\delta d(0)$ for a normal ray is:

$$K(\theta) = \frac{\delta d(\theta)}{\delta d(0)} = \frac{n-1}{\sqrt{n^2 - \sin^2\theta} - \cos\theta}$$

For the more general case where the active surface of the KOE is in contact not with air, but with an optical medium having an index of refraction $n_1$, the relationship between surface relief height $\delta d$ between adjacent zones as a function of predominant angle of incidence $\theta$ is:

$$\Delta d(\theta) = \frac{\lambda}{\sqrt{n^2 - n_0^2 - \sin^2\theta} - n_0\cos\theta}$$

and the correction factor $K(\theta)$ is $$K(\theta) = \frac{n - n_0}{\sqrt{n^2 - n_0^2 - \sin^2\theta} - n_0\cos\theta}$$

A similar analysis is applicable for a KOE having a continuous profile within each zone (rather than a stepped profile), in which case N=1 and the local surface normal 60 (which defines the angle $\theta$) is no longer parallel to the optical axis 18, but rather is tilted at an angle $\theta$ corresponding to the gradient of the desired diffraction profile. In that case, the optimal surface relief height $\delta d$ between adjacent zones for rays parallel to the optical axis is:

$$\Delta d(\vartheta) = \frac{\lambda}{\sqrt{n^2 - n_0^2 - \sin^2\vartheta} - n_0\cos\vartheta}$$

and for the more general case of a predominant ray oriented at an angle $\phi$ with respect to the optical axis (which corresponds to an angle $\phi-\theta$ with respect to the surface normal) is:

$$\Delta d(\varphi) = \frac{\lambda}{\sqrt{n^2 - n_0^2 - \sin^2(\varphi - \vartheta)} - n_0\cos(\varphi - \vartheta)}$$

with the corresponding correction factor $k(\theta,\phi)$ being:

$$K(\theta, \varphi) = \frac{\sqrt{n^2 - n_0^2 - \sin^2(\varphi - \theta)} - n_0\cos(\varphi - \theta)}{\sqrt{n^2 - n_0^2 - \sin^2\varphi} - n_0\cos\varphi}$$

The foregoing equations assume a simple geometrical approach to determining an appropriate value for the angular deviation $\theta$ and that equation (4) is valid for the particular value of $\theta$ thus determined. However, a more rigorous and potentially more accurate solution could possibly be achieved by physical experimentation (for example, by isolating a small off-axis portion of the KOE and tilting it until the intensity of the first order diffraction is at a maximum) and/or by computerized modeling and optimization (in which case, different weights could be assigned to different portions of the image, or to images at different distances).

It should also be noted that the foregoing example also assumed that the overall shape of the KOE 10' is flat. If the KOE had a concave shape such that the normal vector 60 and the marginal ray 54 both converged inwardly toward the optical axis 18, such a shape would at least partially compensate for the efficiency losses caused by the lack of collimation and the required variation in step height would be less. Conversely, if the KOE had a convex shape (which would typically be the case if it were applied to the image facing surface of a spherical lens) then an even greater variation in step height would be required, which would take into account not only the angle that the marginal ray 54 converges towards the optical axis 18, but also the angle that the normal vector 60 diverges away from the optical axis.

Figure 5:
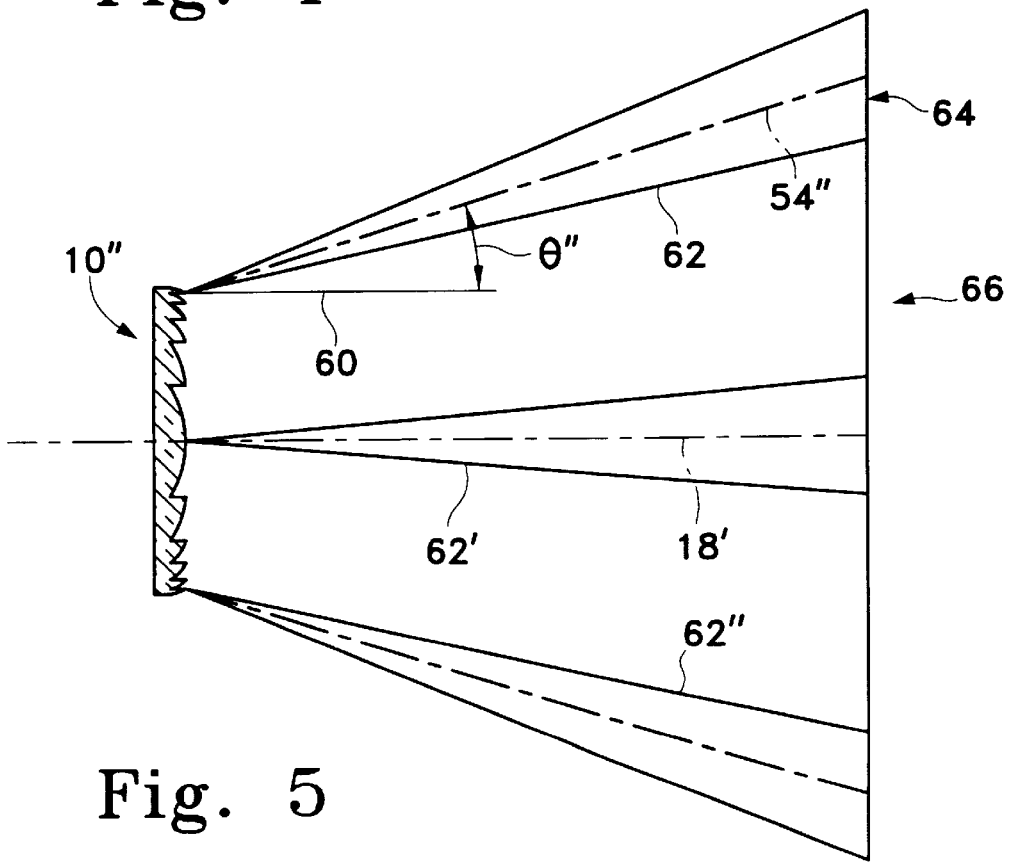
FIG. 5 shows the KOE of FIGS. 1–3 used in an optical system having a large aperture.

Analogously, as shown diagrammatically in FIG. 5, in the case of the wide field of view application, the predominant angle of incidence $\theta''$ may be defined by an exemplary "central" ray 54'' at the geometric center of the cone 62 of rays from only a portion 64 of the entire image field 66. Thus, for a field of view of 35 degrees ($\pm 17.5°$) and a relatively small aperture in which a given point of the KOE sees only a small portion of the entire image field, at the center of the KOE the bundle of rays 62' will subtend a solid angle (cone) centered about the optical axis 18' (ie, $\theta=0°$), while at the extreme edge of the KOE the bundle of rays 62 will be centered about a central ray 54'' intersecting the KOE at an angle $\theta''$ that deviates from normal 60 by 17.5°.

Table 1 compares the computed diffraction efficiency of a KOE with a field of view of 35° ($\pm 17.5°$) with and without adjustment of the step height based on the angle of incidence, and suggests that if the surface relief height 28 of the KOE is varied as set forth above based on the predominant angle of incidence $\theta,\theta',\theta''$, a much more optimal optical diffraction efficiency can be obtained.

TABLE 1

Diffraction Efficiency Comparison for a 35 degree KOE

| Field of View ($\theta$) | Fixed Surface Relief $\delta d(0)$ | Varied Surface Relief $\delta d(\theta)$ |
|---|---|---|
| 0 degree | 0.961 | 0.961 |
| 12.25 degree | 0.956 | 0.961 |
| 17.5 degree | 0.951 | 0.961 |

The surface relief height can be optimized for a single wavelength, or for a broad range of wavelengths each having an associated weight. The kinoform can be used as a solitary element, or can be combined with other optical elements.

While this invention has been described with reference to its presently preferred embodiment(s), its scope is only limited insofar as defined by the following set of claims and all equivalents thereof.

We claim:

1. A kinoform optical element comprising
   an external surface, and
   a plurality of adjacent zones defined on the external surface to diffract waves of electromagnetic radiation,
   wherein:
   each zone has a maximum relief portion and a minimum relief portion relative to the external surface;

the difference between the maximum relief portion and the minimum relief portion of a given zone measured in a direction normal to the external surface defines a maximum relief height for that zone;

the radiation incident on each zone has a respective predominant orientation which varies from zone to zone with respect to a common optical axis; and the maximum relief height for each zone varies from one zone to the next to provide maximum first order diffraction efficiency for radiation having said respective predominant orientation.

2. The kinoform optical element of claim 1 wherein each zone comprises a plurality of steps and the height of each step is determined by the formula:

$$\delta d(\theta) = \frac{\lambda/N}{\sqrt{n^2 - \sin^2\theta} - \cos\theta}$$

δd is the step height in said zone measured in the normal direction relative to the external surface;

λ is the wavelength of the radiation,

N is the number of steps in said zone, n is the refractive index of an optical material from which the kinoform optical element is formed, and θ is the angular deviation from the normal direction of a ray defining said respective predetermined orientation.

3. The kinoform optical element of claim 1 wherein:

the maximum relief height is is related to a maximum relief height that has been optimized for a normal ray correction factor k(θ) which is a function of the refractive index and of the angular deviation between said normal ray and a ray having said predominant orientation.

4. The kinoform optical element of claim 3 wherein said correction factor k(θ) is given by the formula:

$$K(\theta) = \frac{n - n_0}{\sqrt{n^2 - n_0^2 - \sin^2\theta} - n_0 \cos\theta}$$

n is the refractive index of the optical material forming the kinoform optical element, n1 is the refractive index of the optical medium surrounding the kinoform optical element, and θ is said angular deviation.

5. The kinoform optical element of claim 3, wherein:

a diffraction medium functions as a lens element having a relatively large effective aperture and a relatively narrow field of view about said common optical axis, the optical axis is normal to a central portion of the external surface, the predominant orientation of the rays intersecting the central portion is defined by the optical axis, and the predominant orientation of the rays intersecting a point on the peripheral zone of the diffraction medium is defined by a marginal ray connecting that point with a common image point on the optical axis.

6. The kinoform optical element of claim 3, wherein:

a diffraction medium functions as a lens element having a relatively small effective aperture and a relatively wide field of view about said common optical axis, the optical axis is normal to at least a central portion of the external surface, the predominant orientation of the rays intersecting said central portion is defined by the optical axis, and the predominant orientation of the rays intersecting a point on a peripheral zone of the lens diffracton medium is defined by a ray connecting that point with a corresponding peripheral point of the image.

\* \* \* \* \*